United States Patent
Wu et al.

(10) Patent No.: US 12,296,273 B2
(45) Date of Patent: May 13, 2025

(54) METHOD AND APPARATUS FOR GAME TEAM FORMATION, AND ELECTRONIC DEVICE AND STORAGE MEDIUM

(71) Applicant: NETEASE (HANGZHOU) NETWORK CO., LTD., Zhejiang (CN)

(72) Inventors: Jiefu Wu, Zhejiang (CN); Zhijian Chen, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 150 days.

(21) Appl. No.: 17/758,889

(22) PCT Filed: Jul. 15, 2020

(86) PCT No.: PCT/CN2020/102195
§ 371 (c)(1),
(2) Date: Jul. 15, 2022

(87) PCT Pub. No.: WO2021/143079
PCT Pub. Date: Jul. 22, 2021

(65) Prior Publication Data
US 2023/0051099 A1 Feb. 16, 2023

(30) Foreign Application Priority Data

Jan. 15, 2020 (CN) .......................... 202010042900.8

(51) Int. Cl.
*A63F 13/795* (2014.01)
*A63F 13/355* (2014.01)
(Continued)

(52) U.S. Cl.
CPC .......... *A63F 13/795* (2014.09); *A63F 13/355* (2014.09); *A63F 13/44* (2014.09); *A63F 13/798* (2014.09)

(58) Field of Classification Search
CPC ...... A63F 13/795; A63F 13/355; A63F 13/44; A63F 13/798; A63F 13/352; A63F 13/79; A63F 13/86; A63F 13/35
See application file for complete search history.

(56) References Cited

U.S. PATENT DOCUMENTS

| 10,343,071 B2 | 7/2019 | Lockton et al. |
| 2008/0146342 A1* | 6/2008 | Harvey ................... A63F 13/10 463/42 |

(Continued)

FOREIGN PATENT DOCUMENTS

| CN | 102917764 A | 2/2013 |
| CN | 104363476 A | 2/2015 |

(Continued)

OTHER PUBLICATIONS

International Search Report dated Oct. 22, 2020 of PCT International Application No. PCT/CN2020/102195.

(Continued)

*Primary Examiner* — Omkar A Deodhar
*Assistant Examiner* — Shauna-Kay Hall
(74) *Attorney, Agent, or Firm* — Qinghong Xu (57) ABSTRACT

A method and apparatus for game teaming in live streaming, and an electronic device and a computer-readable storage medium, relating to the technical field of computers. The method comprises: receiving a game teaming request, the game teaming request comprising user information of multiple game participants, the multiple game participants comprising a live streaming anchor user and at least one live streaming viewer user, the live streaming viewer user sat- (Continued)

isfying a specified live streaming teaming condition (S210); sending the game teaming request to a gaming platform (S220); and displaying a game teaming instruction returned by the gaming platform, so that the multiple game participants enter the gaming platform according to the game teaming instruction (S230).

16 Claims, 3 Drawing Sheets

(51) Int. Cl.
*A63F 13/44* (2014.01)
*A63F 13/798* (2014.01)

(56) References Cited

U.S. PATENT DOCUMENTS

| | | | | |
|---|---|---|---|---|
| 2010/0173712 | A1* | 7/2010 | Buhr | A63F 13/795 |
| | | | | 463/42 |
| 2014/0243083 | A1* | 8/2014 | Bae | A63F 13/335 |
| | | | | 463/31 |
| 2017/0001111 | A1* | 1/2017 | Willette | A63F 13/49 |
| 2017/0072322 | A1* | 3/2017 | Navok | A63F 13/5252 |
| 2017/0282082 | A1* | 10/2017 | Hubbard | G06Q 10/101 |
| 2018/0169528 | A1* | 6/2018 | Hinoshita | A63F 13/795 |
| 2019/0275431 | A1* | 9/2019 | Labate | A63F 13/86 |
| 2020/0016495 | A1* | 1/2020 | Cruz | A63F 13/355 |
| 2020/0244711 | A1* | 7/2020 | Engel | H04L 65/60 |

FOREIGN PATENT DOCUMENTS

| | | |
|---|---|---|
| CN | 107281756 A | 10/2017 |
| CN | 108347655 A | 7/2018 |
| CN | 108391156 A | 8/2018 |
| CN | 109011590 A | 12/2018 |
| CN | 109120945 A | 1/2019 |
| CN | 109173271 A | 1/2019 |
| CN | 109224456 A | 1/2019 |
| CN | 109246440 A | 1/2019 |
| CN | 110354504 A | 10/2019 |
| CN | 110381333 A | 10/2019 |
| CN | 110461430 A | 11/2019 |
| CN | 110496396 A | 11/2019 |
| CN | 110505528 A | 11/2019 |
| CN | 111265886 A | 6/2020 |
| CN | 111330286 A | 6/2020 |
| WO | 2013069911 A1 | 5/2013 |

OTHER PUBLICATIONS

First Office Action dated Nov. 4, 2020 of Chinese Patent No. 202010042900.8.
Notice of Allowance dated Apr. 29, 2021 of Chinese Patent No. 202010042900.8.
How to play games with the anchor? Apr. 7, 2019, https://www.sohu.com/a/306348367_120099898.

* cited by examiner

METHOD AND APPARATUS FOR GAME TEAM FORMATION, AND ELECTRONIC DEVICE AND STORAGE MEDIUM

CROSS-REFERENCE TO RELATED APPLICATIONS

The present disclosure is the U.S. national phase application of International Application No. PCT/CN2020/102195, filed on Jul. 15, 2020, which is based on and claims priority to Chinese Patent Application No. 202010042900.8, filed with the Chinese Patent Office on Jan. 15, 2020, titled "METHOD AND APPARATUS FOR GAME TEAM FORMATON, AND ELECTRONIC DEVICE AND STORAGE MEDIUM", which are incorporated herein by reference in their entireties for all purposes.

TECHNICAL FIELD

The present disclosure relates to the field of computer technologies, and in particular, to a method and apparatus for forming a game team in a live streaming, an electronic device, and a computer-readable storage medium.

BACKGROUND

At present, various live streaming platforms, especially those mainly based on content of game live streaming, are doing activities such as playing games with other, making appointments to play games, and forming a premade game team with a group of people who know each other and might sitting together to communicate easily. In the related art, the method for formatting a game team is as follows: a user goes to a live streaming room of an anchor, opens an event page for opening a premade game team, and applies to form the premade game team with the anchor. The anchor and the user add social accounts or live streaming platform accounts with each other to be friends and enter the game, add friends to each other in the game, and then perform teaming requirements in the game, and finally complete the premade game team. However, this method for forming the premade game team in the game has a long path (with tedious steps) and low efficiency.

It should be noted that the information disclosed in the above Background section is only for enhancement of understanding of the background of the present disclosure, and therefore may contain information that does not form the prior art that is already known to a person of ordinary skill in the art.

SUMMARY

According to a first aspect of the embodiments of the present disclosure, there is provided a method for forming a game team in a live streaming. The method may include: receiving a game teaming request, wherein the game teaming request comprises user information of a plurality of game participants, the plurality of game participants comprise a live streaming anchor user and at least one live streaming viewer user, and the live streaming viewer user meets a live streaming teaming condition; sending the game teaming request to a gaming platform; and displaying a game teaming instruction returned by the gaming platform to enable the plurality of game participants enter the gaming platform according to the game teaming instruction.

According to a second aspect of the disclosure, there is provided an electronic device. The electronic device may include: a processor and memory for storing instructions executable by the processor; wherein the processor is configured to receive a game teaming request, wherein the game teaming request comprises user information of a plurality of game participants, the plurality of game participants comprise a live streaming anchor user and at least one live streaming viewer user, and the live streaming viewer user meets a live streaming teaming condition; send the game teaming request to a gaming platform; and display a game teaming instruction returned by the gaming platform to enable the plurality of game participants enter the gaming platform according to the game teaming instruction.

According to a forth aspect of the disclosure, there is provided a computer-readable storage medium with a computer program stored thereon, wherein when the computer program is executed by a processor, the processor implements steps in a method for forming a game team in a live streaming. The method for forming the game team in the live streaming may include: receiving a game teaming request, wherein the game teaming request comprises user information of a plurality of game participants, the plurality of game participants comprise a live streaming anchor user and at least one live streaming viewer user, and the live streaming viewer user meets a live streaming teaming condition; sending the game teaming request to a gaming platform; and displaying a game teaming instruction returned by the gaming platform to enable the plurality of game participants enter the gaming platform according to the game teaming instruction.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure. Obviously, the drawings in the following description are only some embodiments of the present disclosure, and for those of ordinary skill in the art, other drawings can also be obtained from these drawings without creative effort.

DETAILED DESCRIPTION

Example embodiments will now be described more fully with reference to the accompanying drawings. Example embodiments, however, can be embodied in various forms and should not be construed as limited to the examples set forth herein; rather, these embodiments are provided so that this disclosure will be thorough and complete, and will fully convey the concept of example embodiments to those skilled in the art. The described features, structures, or characteristics may be combined in any suitable manner in one or more embodiments.

It should be noted that, in the present disclosure, the terms "comprising", "configured with", and "disposed on" are used to indicate an open-ended inclusive meaning, and refer to other elements/components/etc., in addition to the listed elements/components/etc. may also be present; the terms "first," "second," etc. are used merely as labels and not as limitations on the number or order of the objects.

In order to solve the problem of low game teaming efficiency in the related art, the embodiments of the present disclosure provide a method for forming a game team in the live streaming, and an apparatus, an electronic device and a computer-readable storage medium, which can improve the game teaming efficiency.

Figure 1:
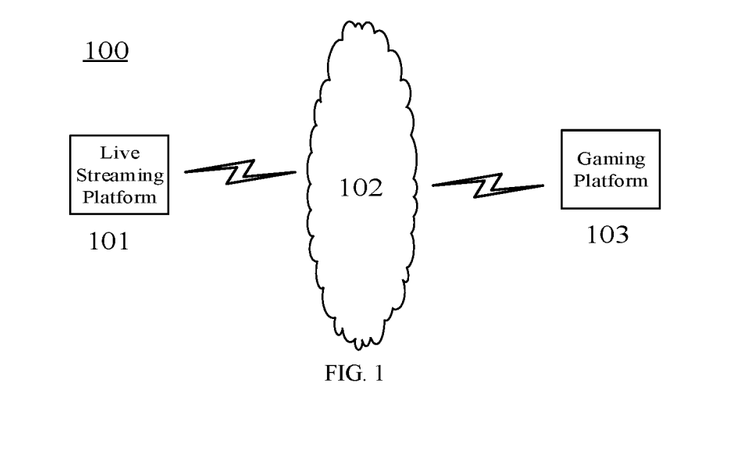
FIG. 1 shows a schematic diagram of a system architecture of an exemplary application environment to which a method and apparatus for forming a game team in a live streaming according to an embodiment of the present disclosure can be applied.

FIG. 1 shows a schematic diagram of a system architecture of an exemplary application environment to which a method and apparatus for forming a game team in a live streaming according to an embodiment of the present disclosure can be applied.

As shown in FIG. 1, the system architecture 100 may include a live streaming platform 101, a network 102 and a gaming platform 103. The network 102 is medium used to provide a communication link between the live streaming platform 101 and the gaming platform 103. The network 102 may include various connection types, such as wired, wireless communication links, or fiber optic cables, among others. The live streaming platform 101 can automatically form a game team by interacting with the gaming platform 103, that is, game teaming.

Figure 2:
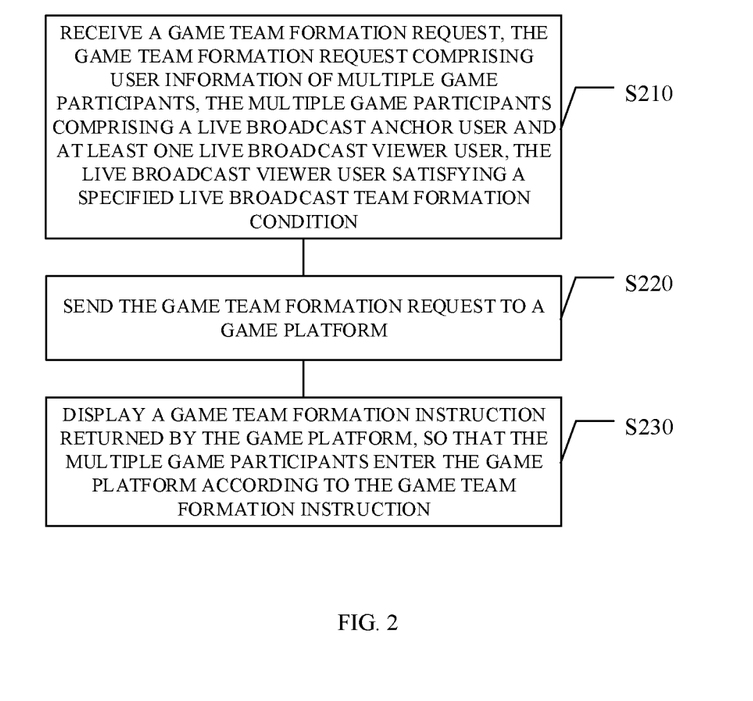
FIG. 2 shows a flowchart of a method for forming a game team in a live streaming according to an embodiment of the present disclosure.

Referring to FIG. 2, FIG. 2 shows a flowchart of a method for forming a game team in a live streaming according to an embodiment of the present disclosure. The method can be executed by the live streaming platform 101, and includes the following steps.

At a step S210, a game teaming request is received, the game teaming request includes user information of a plurality of game participants, the plurality of game participants include a live streaming anchor user and at least one live streaming viewer user, and the live streaming viewer user meets a specified live streaming teaming condition.

At a step S220, the game teaming request is sent to a gaming platform.

At a step S230, a game teaming instruction returned by the gaming platform is displayed, so that the plurality of game participants enter the gaming platform according to the game teaming instruction.

The method for forming the game team in the live streaming according to an embodiment of the present disclosure can automatically form a game team for multiple game participants through the interaction between the live streaming platform and the gaming platform. On the one hand, it can reduce the path or steps of game teaming in live streaming and improve the efficiency of game teaming. On the other hand, the operations of game participants can be reduced, and the user experience can be improved.

The following is a more detailed introduction to the method for forming the game team in the live streaming according to the embodiment of the present disclosure.

At the step S210, a game teaming request is received, the game teaming request includes user information of a plurality of game participants, the plurality of game participants include a live streaming anchor user and at least one live streaming viewer user, and the live streaming viewer user meets a specified live streaming teaming condition, i.e., the specified live streaming team formation condition.

In the embodiment of the present disclosure, during the live streaming of the game, the live streaming anchor user and the live streaming viewer user can form a game team. The live streaming anchor user can set the live streaming teaming condition, and select teammates through the live streaming teaming condition. The live streaming teaming condition (i.e., the condition for forming the game team in the live streaming) may include at least one of the following: the live streaming viewer user follows the live streaming anchor user on the live streaming platform, and the live streaming viewer user presents a gift to the live streaming anchor user on the live streaming platform. Of course, the live streaming anchor user can also determine whether to form a team with the live streaming viewer user according to other relevant information of the live streaming viewer user, or set other live streaming teaming condition, which are not limited in this disclosure.

The live streaming anchor user can send a game teaming request to the live streaming platform after confirming that the live streaming viewer user meets the live streaming teaming condition. For example, a live streaming anchor user can create a game teaming request on a game teaming page of the live streaming platform, and submit the game teaming request to the live streaming platform. The game teaming request includes the user information of the plurality of game participants (i.e., the live streaming anchor user and at least one live streaming viewer user). The user information of each game participant may include: user name, gender, age, user level, game character information, and the like.

At the step S220, a game teaming request is sent to the gaming platform.

Figure 3:
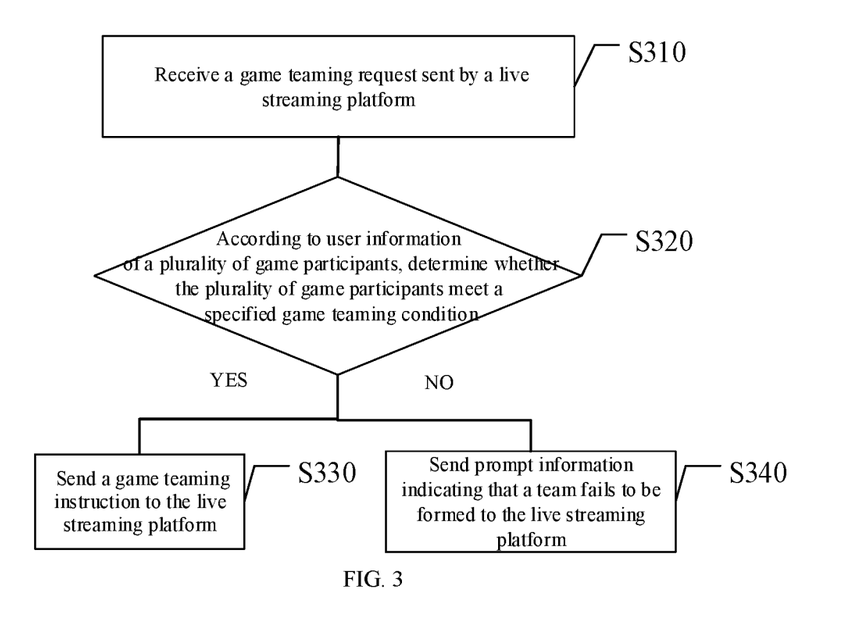
FIG. 3 shows another flowchart of a method for forming a game team in a live streaming according to an embodiment of the present disclosure.

It should be noted that the method for forming the game team in the embodiment of the present disclosure can be executed on the gaming platform side, so the live streaming platform can send the game teaming request to the gaming platform, so that the gaming platform can determine whether forming the game team can be performed. Referring to FIG. 3, FIG. 3 shows another flowchart of the method for forming a game team in a live streaming according to an embodiment of the present disclosure, which is applied to a gaming platform and may include the following steps.

At a step S310, a game teaming request sent by a live streaming platform is received.

At a step S320, according to user information of a plurality of game participants, whether the plurality of game participants meet a specified game teaming condition or a specified live streaming condition is determined. A step S330 is executed when it is determined that the plurality of game participants meet the game teaming condition; and a step S340 is executed when it is determined that the plurality of game participants do not meet the game teaming condition.

It can be understood that, when the plurality of game participants form a game team, they usually play the same game, and the same game may include multiple different game characters. Then, in an exemplary embodiment of the present disclosure, the gaming platform may determine whether the plurality of game participants meet the game teaming condition according to the game character information of the plurality of game participants. If the game character information of the plurality of game participants belongs to the same game, it means that the plurality of game participants meet the game teaming condition; if the game character information of the plurality of game participants does not belong to the same game, it means that the plurality of game participants are not meet the game teaming condition.

In addition, for some games, users can only participate in the game when their level is higher than a certain level, and they cannot participate in the game when they are lower than this level. In some embodiments, the level of the team members must be within a certain range. In yet another exemplary embodiment of the present disclosure, the gaming platform may further determine whether the plurality of game participants meet the game teaming condition according to the user levels of the plurality of game participants. If the user levels of all game participants are higher than a certain level, it means that the plurality of game participants meet the game teaming condition. If there is a game participant whose user level is lower than a certain level among the plurality of game participants, it means that the plurality of game participants do not meet the game teaming condition.

In some embodiments, it is also possible to determine whether the plurality of game participants meet the game teaming condition according to both of the game character information and the user level. For example, when the game character information of the plurality of game participants all belong to the same game, and the user levels of the plurality of game participants are all higher than a certain level, it is determined that the plurality of game participants meet the game teaming condition; otherwise, it is determined that the plurality of game participants do not meet the game teaming condition. It should be noted that, in the embodiment of the present disclosure, it is also possible to determine whether the plurality of game participants meet the game teaming condition through other user information of the plurality of game participants, which will not be listed one by one here.

In an exemplary embodiment of the present disclosure, when it is determined that the plurality of game participants meet the game teaming condition, the gaming platform may also automatically add the plurality of game participants as friends in the gaming platform to avoid the game participants to add others manually, so as to improve the user experience. Moreover, when a game team needs to be formed again, the game team can be directly formed through the friend relationship of the gaming platform, so that the efficiency of the game teaming can be improved.

At a step S330, a game teaming instruction is sent to the live streaming platform.

In this embodiment of the present disclosure, the game teaming instruction is used to instruct the game participants to enter the game, and the game teaming instruction may include information related to entering the game. For example, it may include a link to enter the game, a countdown period for entering the game, etc., wherein the countdown period may be 60 seconds, 90 seconds, and the like.

At a step S340, prompt information indicating that a team fails to be formed is sent to the live streaming platform.

Wherein, the prompt information indicating the failure of the team formation may be "team formation failure (i.e., game teaming failure)", and may also be a specific reason for the failure of the team formation, for example, "game character does not match", "user level does not match", and so on. In this way, the live streaming anchor user in the live streaming platform can modify the user information, and resend the game teaming request according to the modified user information.

At a step S230, a game teaming instruction returned by the gaming platform is displayed, so that the plurality of game participants enter the gaming platform according to the game teaming instruction.

In the embodiment of the present disclosure, after receiving the game teaming instruction returned by the gaming platform, the live streaming platform may display the game teaming instruction on the live streaming platform to guide the users or participants to enter the gaming platform. For example, a link to enter the game, a countdown period for entering the game, etc. may be displayed, so that the plurality of game participants open a game client within the preset countdown period. If the plurality of game participants all open the game client within the preset countdown period, the plurality of game participants will be automatically matched to one game team; otherwise, the game team will not be formed for the plurality of game participants, that means the game team formation is failed.

In an exemplary embodiment of the present disclosure, after successfully forming a team for the plurality of game participants, the plurality of game participants can enter a game mode and start a game, which can be managed by the anchor user as a team leader. After the game is over, the gaming platform can send the game result information to the live streaming platform. The game result information may be the outcome of the game, such as who wins or who fails, and the like. After obtains the game result information, the live streaming platform can allocate designated virtual resources in the live streaming platform to the plurality of game participants according to the game result information. For example, virtual resources may be allocated to winning game participants. Compared with the prior art in which the live streaming anchor user settles manually on the live streaming platform according to the game outcome, the accuracy of the game settlement can be improved.

In the method for forming the game team in the live streaming of the embodiment of the present disclosure, the live streaming platform sends the game teaming request to the gaming platform, so that the gaming platform determines whether to form a team for the plurality of game participants according to the user information in the game teaming request, and display the game teaming instruction to the plurality of game participants through the live streaming platform, so as to guide the plurality of game participants to enter the gaming platform, so as to complete the game teaming. It can be seen that during the game team formation process (i.e., the game teaming process), the game participants have fewer operations, which can improve the user experience. In addition, the process of game teaming is simple, which can reduce the path of game teaming in the live streaming, and improve the efficiency of game teaming. In addition, after the game is over, the live streaming platform can also perform settlement automatically, thus improving the accuracy of game settlement.

It should be noted that although the various steps of the methods of the present disclosure are depicted in the figures in a particular order, this does not require or imply that the steps must be performed in that particular order, or that all illustrated steps must be performed to achieve the desired result. Additionally or alternatively, certain steps may be omitted, multiple steps may be combined into one step for execution, and/or one step may be decomposed into multiple steps for execution, and the like.

Figure 4:
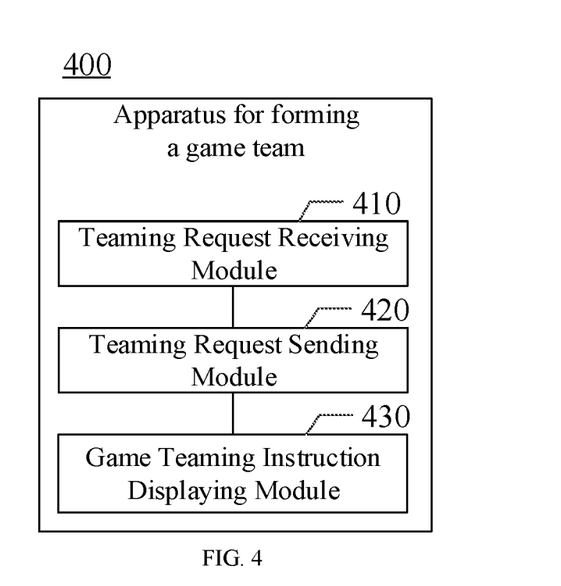
FIG. 4 shows a schematic structural diagram of an apparatus for forming a game team in a live streaming according to an embodiment of the present disclosure.

Further, in this example embodiment, an apparatus 400 for forming a game team in a live streaming is also provided. Referring to FIG. 4, FIG. 4 shows a schematic structural diagram of the apparatus for forming the game team in live streaming according to an embodiment of the present disclosure. The apparatus may include a teaming request receiving module 410, a teaming request sending module 420, a game teaming instruction display module 430.

The teaming request receiving module 410 is configured to receive a game teaming request, wherein the game teaming request comprises user information of a plurality of game participants, the plurality of game participants comprise a live streaming anchor user and at least one live streaming viewer user, and the live streaming viewer user meets a specified live streaming teaming condition.

The teaming request sending module 420 is configured to send the game teaming request to a gaming platform;

The game teaming instruction displaying module 430 is configured to display a game teaming instruction returned by the gaming platform, so that the plurality of game participants enter the gaming platform according to the game teaming instruction.

In some embodiments, the apparatus for forming the game team in the living streaming according to the embodiment of the present disclosure further includes a game teaming determination module and a game teaming instruction sending module.

The game teaming determination module is configured to determine, by the gaming platform, whether the plurality of game participants meet the specified game teaming condition, according to the user information of the plurality of game participants.

The game teaming instruction sending module is configured to, in response to that the plurality of game participants meet the game teaming condition, send the game teaming instruction to the live streaming platform.

In some embodiments, the apparatus for forming the game team in the live streaming of the embodiment of the present disclosure further includes a game result information obtaining module and a resource allocation module.

The game result information obtaining module is configured to obtain game result information.

The resource allocation module is configured to allocate designated virtual resources in the live streaming platform to the plurality of game participants, according to the game result information.

In some embodiments, the apparatus for forming the game team in the live streaming of the embodiment of the present disclosure further includes a gaming platform friend adding module, which is configured to automatically add, by the gaming platform, the plurality of game participants as friends in the gaming platform In some embodiments, the game teaming request is sent by the live streaming anchor user to the live streaming platform after determining that the live streaming viewer user meets the live streaming teaming condition.

In some embodiments, the game teaming instruction displaying module is specifically configured to display a game teaming instruction returned by the gaming platform, to enable each of the plurality of game participants to open a game client within a preset countdown period.

In some embodiments, the user information of each of the plurality of game participants comprises game character information of said game participant and the game teaming determination module is specifically configured to determine, by the gaming platform, whether the plurality of game participants meet the game teaming condition, according to the game character information of each of the plurality of game participants.

In some embodiments, the user information of each of the plurality of game participants comprises a user level of said game participant and the game teaming determination module is specifically configured to determine, by the gaming platform, whether the plurality of game participants meet the game teaming condition, according to the user level of each of the plurality of game participants.

In some embodiments, the live streaming teaming condition comprises at least one of: the live streaming viewer user follows the live streaming anchor user on the live streaming platform, and the live streaming viewer user presents a gift to the live streaming anchor user on the live streaming platform.

The specific details of each module/unit in the above-mentioned apparatus have been described in detail in the embodiments of the method section, and thus are not repeated here.

It should be noted that although several modules or units of the apparatus for action performance are mentioned in the above detailed description, this division is not mandatory. Indeed, according to embodiments of the present disclosure, the features and functions of two or more modules or units described above may be embodied in one module or unit. Conversely, the features and functions of one module or unit described above may be further divided into multiple modules or units to be embodied.

In an exemplary embodiment of the present disclosure, an electronic device is also provided, comprising: a processor; a memory for storing instructions executable by the processor; wherein the processor is configured to execute any one of the methods described in present exemplary embodiments.

Figure 5:
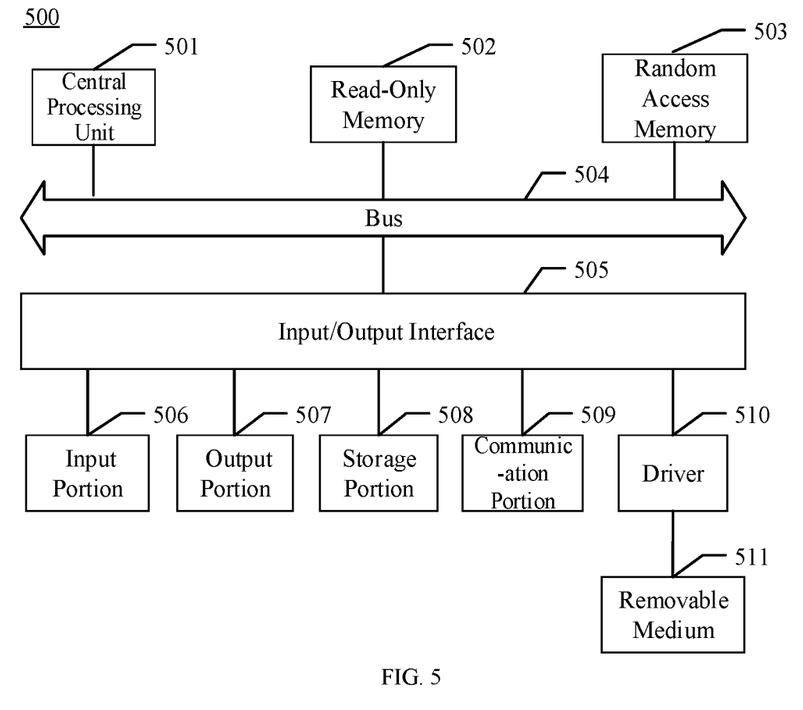
FIG. 5 shows a schematic structural diagram of a computer system for implementing an electronic device according to an embodiment of the present disclosure.

FIG. 5 shows a schematic structural diagram of a computer system for implementing an electronic device according to an embodiment of the present disclosure. It should be noted that the computer system 500 of the electronic device shown in FIG. 5 is only an example, and should not bring any limitation to the function and scope of use of the embodiment of the present disclosure.

As shown in FIG. 5, the computer system 500 includes a central processing unit (CPU) 501, which can perform various appropriate actions and processing based on a program stored in a read-only memory (ROM) 502 or a program loaded from a storage portion 508 into a random access memory (RAM) 503. In RAM 503, various programs and data required for system operation are also stored. The CPU 501, the ROM 502, and the RAM 503 are connected to each other through a bus 504. An input/output (I/O) interface 505 is also connected to the bus 504.

The following components are connected to the I/O interface 505: an input portion 506 including a keyboard, a mouse, etc.; an output portion 507 including a cathode ray tube (CRT), a liquid crystal display (LCD), etc., and speakers, etc.; a storage portion 508 including a hard disk, etc.; and a communication portion 509 including a network interface card such as a LAN card, a modem, and the like. The communication portion 509 performs communication processing via a network such as the Internet. The driver 510 is also connected to the I/O interface 505 as required. A removable medium 511, such as a magnetic disk, an optical disk, a magneto-optical disk, a semiconductor memory, etc., is installed on the driver 510 as required, so that the computer program read from removable medium 510 is installed into the storage portion 508 as required.

In particular, according to an embodiment of the present disclosure, the process described above with reference to the flowchart can be implemented as a computer software program. For example, an embodiment of the present disclosure includes a computer program product, which includes a computer program carried on a computer-readable medium, and the computer program contains program code for executing the method shown in the flowchart. In such an embodiment, the computer program may be downloaded from the network through the communication portion 509 and installed, and/or downloaded from the removable medium 511 and installed. When the computer program is executed by the central processing unit (CPU) 501, it executes the above-mentioned functions defined in the apparatus of the present disclosure.

In an exemplary embodiment of the present disclosure, there is also provided a computer-readable storage medium on which a computer program is stored, and when the computer program is executed by a processor, implements any one of the methods described above.

The purpose of the present disclosure is to provide a method for forming a game team and an apparatus, an electronic device and a computer-readable storage medium, so as to at least to a certain extent overcome the problem of low game teaming efficiency caused by the limitations and defects of the prior art.

Other features and advantages of the present disclosure will become apparent from the following detailed description, or be learned in part by practice of the present disclosure.

It should be noted that the computer-readable medium shown in the present disclosure may be may be, for example, but not limited to, an electrical, magnetic, optical, electromagnetic, infrared, or semiconductor system, apparatus or device, or any combination of the above. More specific examples of computer-readable storage media may include, but are not limited to: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In the present disclosure, the computer-readable storage medium may be any tangible medium that contains or stores a program, and the program may be used by or in combination with an instruction execution system, apparatus, or device. In the present disclosure, a computer-readable signal medium may include a data signal propagated in a baseband or propagated as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable medium other than the computer-readable storage medium. The computer-readable medium may send, propagate or transmit the program for use by or in combination with the instruction execution system, apparatus, or device. The program code contained on the computer-readable medium can be transmitted by any suitable medium, including but not limited to: wireless, wire, optical cable, RF, etc., or any suitable combination of the foregoing.

Other embodiments of the present disclosure will readily come to the mind of those skilled in the art upon consideration of the specification and practice of the application disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, with the true scope and spirit of the disclosure being indicated by the claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for forming a game team in a live streaming, comprising:
    receiving, by a live streaming platform, a game teaming request, wherein the game teaming request comprises user information of a plurality of game participants, the plurality of game participants comprise a live streaming anchor user and at least one live streaming viewer user, and the live streaming viewer user meets a first condition;
    sending, by the live streaming platform, the game teaming request to a gaming platform;
    determining, by the gaming platform, that the plurality of game participants meet a second condition based on the game teaming request, and automatically adding, by the gaming platform, the plurality of game participants as friends in the gaming platform, wherein the second condition comprises all of the plurality of game participants have game character information relating to a same game; and after the plurality of game participants are added as friends, the plurality of game participants form a game team directly in response to a request from one of the plurality of game participants to form the game team again; and
    receiving, by the live streaming platform, a game teaming instruction returned by the gaming platform, and displaying the game teaming instruction to enable the plurality of game participants to enter the gaming platform according to the game teaming instruction;
    wherein the game teaming request is sent by the live streaming anchor user to the live streaming platform after determining that the live streaming viewer user meets the first condition.

2. The method according to claim 1, further comprising:
    determining, by the gaming platform, whether the plurality of game participants meet the second condition, according to the user information of the plurality of game participants, wherein the user information of the plurality of game participants comprises the game character information of the plurality of game participants; and
    in response to that the plurality of game participants meet the second condition, sending the game teaming instruction to the live streaming platform.

3. The method according to claim 2, wherein the user information of each of the plurality of game participants comprises the game character information of said game participant;
    wherein the determining, by the gaming platform, whether the plurality of game participants meet the second condition, according to the user information of the plurality of game participants comprises:
    determining, by the gaming platform, whether the plurality of game participants meet the second condition, according to the game character information of each of the plurality of game participants.

4. The method according to claim 3, wherein the user information of each of the plurality of game participants further comprises a user level of said game participant;
   wherein the determining, by the gaming platform, whether the plurality of game participants meet the second condition, according to the user information of the plurality of game participants further comprises:
   determining, by the gaming platform, whether the plurality of game participants meet the second condition, according to the user level of each of the plurality of game participants.

5. The method according to claim 4, wherein the second condition further comprises: the user levels of all of the plurality of game participants are higher than a same level.

6. The method according to claim 1, further comprising:
   obtaining, by the live streaming platform, game result information from the gaming platform; and
   allocating, by the live streaming platform, virtual resources in the live streaming platform to the plurality of game participants, according to the game result information.

7. The method according to claim 1, wherein enabling the plurality of game participants to enter the gaming platform according to the game teaming instruction comprises:
   enabling each of the plurality of game participants to open a game client within a preset countdown period.

8. The method according to claim 1, wherein the first condition comprises at least one of: the live streaming viewer user follows the live streaming anchor user on the live streaming platform, and the live streaming viewer user presents a gift to the live streaming anchor user on the live streaming platform.

9. An electronic device, comprising:
   a processor; and
   memory for storing instructions executable by the processor;
   wherein, when the electronic device is configured in a live streaming platform, the processor is configured to:
   receive a game teaming request, wherein the game teaming request comprises user information of a plurality of game participants, the plurality of game participants comprise a live streaming anchor user and at least one live streaming viewer user, and the live streaming viewer user meets a first condition;
   send the game teaming request to a gaming platform, wherein when the electronic device is configured in the gaming platform, the processor is configured to: determine that the plurality of game participants meet a second condition based on the game teaming request, and automatically add the plurality of game participants as friends in the gaming platform, wherein the second condition at least comprises all of the plurality of game participants have game character information relating to a same game; and after the plurality of game participants are added as friends, the plurality of game participants form a game team directly in response to a request from one of the plurality of game participants to form the game team again; and
   receive a game teaming instruction returned by the gaming platform, and display the game teaming instruction to enable the plurality of game participants to enter the gaming platform according to the game teaming instruction;
   wherein the game teaming request is sent by the live streaming anchor user to the live streaming platform after determining that the live streaming viewer user meets the first condition.

10. The electronic device according to claim 9, wherein when the electronic device is configured in the gaming platform, the processor is further configured to:
    determine whether the plurality of game participants meet the second condition, according to the user information of the plurality of game participants, wherein the user information of the plurality of game participants comprises the game character information of the plurality of game participants; and
    in response to that the plurality of game participants meet the second condition, send the game teaming instruction to the live streaming platform.

11. The electronic device according to claim 10, wherein the user information of each of the plurality of game participants comprises the game character information of said game participant;
    wherein when the electronic device is configured in the gaming platform, the processor is configured to determine whether the plurality of game participants meet the second condition, according to the game character information of each of the plurality of game participants.

12. The electronic device according to claim 11, wherein the user information of each of the plurality of game participants further comprises a user level of said game participant;
    wherein when the electronic device is configured in the gaming platform, the processor is configured to determine, by the gaming platform, whether the plurality of game participants meet the second condition, according to the user level of each of the plurality of game participants.

13. The electronic device according to claim 9, wherein the first condition comprises at least one of: the live streaming viewer user follows the live streaming anchor user on the live streaming platform, and the live streaming viewer user presents a gift to the live streaming anchor user on the live streaming platform.

14. The electronic device according to claim 9, wherein when the electronic device is configured in the live streaming platform, the processor is configured to enable each of the plurality of game participants to open a game client within a preset countdown period.

15. The electronic device according to claim 9, wherein when the electronic device is configured in the live streaming platform, the processor is further configured to:
    obtain game result information from the gaming platform; and
    allocate virtual resources in the live streaming platform to the plurality of game participants, according to the game result information.

16. A non-transitory computer-readable storage medium with a computer program stored thereon, wherein when the computer program is executed by a processor, the processor implements a method for forming a game team in a live streaming,
    wherein the method for forming the game team in the live streaming comprises:
    receiving a game teaming request, wherein the game teaming request comprises user information of a plurality of game participants, the plurality of game participants comprise a live streaming anchor user and at least one live streaming viewer user, and the live streaming viewer user meets a first condition;
    sending the game teaming request to a gaming platform, wherein the gaming platform is configured to: determine that the plurality of game participants meet a second condition based on the game teaming request, and automatically add the plurality of game participants as friends in the gaming platform, wherein the second condition at least comprises all of the plurality of game participants have game character information relating to a same game; and after the plurality of game participants are added as friends, the plurality of game participants form a game team directly in response to a request from one of the plurality of game participants to form the game team again; and receiving a game teaming instruction returned by the gaming platform, and displaying the game teaming instruction to enable the plurality of game participants to enter the gaming platform according to the game teaming instruction;

wherein the game teaming request is sent by the live streaming anchor user to the live streaming platform after determining that the live streaming viewer user meets the first condition.

\* \* \* \* \*